United States Patent
Gotoh et al.

(10) Patent No.: US 6,822,752 B1
(45) Date of Patent: Nov. 23, 2004

(54) COLOR IMAGE FORMING METHOD AND COLOR IMAGE FORMING DEVICE

(75) Inventors: Makio Gotoh, Nara (JP); Kazuyuki Hamada, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 867 days.

(21) Appl. No.: 09/626,288

(22) Filed: Jul. 25, 2000

(30) Foreign Application Priority Data

Aug. 2, 1999 (JP) ............................................. 11-219128

(51) Int. Cl.[7] .............................. B41J 1/00; G06K 9/00
(52) U.S. Cl. ........................ 358/1.1; 358/1.1; 382/100; 382/165
(58) Field of Search ................................. 358/1.1, 3.28; 382/100; 283/75, 94, 107, 110, 112

(56) References Cited

U.S. PATENT DOCUMENTS

| | | | | |
|---|---|---|---|---|
| 5,257,119 A | | 10/1993 | Funada et al. | 358/438 |
| 5,465,161 A | | 11/1995 | Funada et al. | 358/438 |
| 5,737,100 A | | 4/1998 | Funada et al. | 358/501 |
| 5,742,408 A | | 4/1998 | Funada et al. | 358/501 |
| 6,095,566 A | * | 8/2000 | Yamamoto et al. | 283/75 |
| 6,570,997 B2 | * | 5/2003 | Noguchi | 382/100 |

FOREIGN PATENT DOCUMENTS

| | | |
|---|---|---|
| JP | 05-103188 | 4/1993 |
| JP | 6-662217 | 3/1994 |
| JP | 7-107279 | 4/1995 |
| JP | 2614369 | 2/1997 |
| JP | 11-032205 | 2/1999 |
| JP | 11-073504 | 3/1999 |

OTHER PUBLICATIONS

Japan Patent Office First Office Action dated Feb. 24, 2004 (2 pp.) for application No. 11-219128.
Partial English Transl ation of Japanese Examined Patent Publication No. 2614369 (2 pp.) corresponding to previously submitted reference BC (2614369).

* cited by examiner

*Primary Examiner*—Gabriel Garcia
*Assistant Examiner*—Thierry Pham
(74) *Attorney, Agent, or Firm*—Edwards & Angell, LLP; David G. Conlin; George W. Hartnell, III

(57) ABSTRACT

In a copier, a specific pattern being hardly recognizable by human eyes but recognizable by a recognizing means is added onto a color image to be printed on a recording medium in order to clearly indicate that the printed image is a copy image. RGB-color image data is converted by a post processing portion of an image processing unit into YMCK color image data. An additional color forming unit calculates color data YaMaCaKa of a specific pattern received from a specific pattern generating unit based on the RGB-color image data. A combining unit generates output Y'M'C'K'-color image data including the specific pattern color image data by combining YMCK color data with the specific pattern data of YaMaCaKa. An image output unit adds the specific pattern on the color image according to the Y'M'C'K' color image data.

9 Claims, 10 Drawing Sheets

COLOR IMAGE FORMING METHOD AND COLOR IMAGE FORMING DEVICE

BACKGROUND OF THE INVENTION

The present invention relates to a color image forming method and device for forming a color image on a recording medium by processing input color image data and, more particularly, to a method and device for recording a specific information on an output image adding to a color image on a recording medium a specific pattern that is unrecognizable by human eyes and recognizable by recognizing means.

The recent development of image forming devices in respect to forming an image being true to an original image has created the possibility of reproducing, by using color image forming device such as color copiers in particular, faithful color copies that are true to and cannot be distinguished by human eye from the original. This arises a problem of reproduction of faithful color copies of prohibited originals by using color image forming devices including color copiers.

To prevent the reproduction of the prohibited originals, two kinds of techniques have been applied to image forming devices. The first technique forces a color forming device to extract a feature of an input original image, which indicates the prohibition on its illegal reproduction, and causes the device to further reproduce such the prohibited material. The second technique causes the device to apply specific additional information to an image formed from an input original in order to clearly indicate that the formed image is a copy of the copyrighted original.

The second technique has the following two examples:

Japanese Patent Publication No. 2614369 describes a technique for attaching a specific pattern onto a color image by using coloring materials difficult to be recognized by human eyes (for example, a yellow color pattern on a recording medium such as white recording paper) when outputting the color image according to data of an input color image using a plurality of visible coloring materials.

This method characterized by putting a specific pattern unique to the device by using coloring material difficult to be recognized by human eyes. Therefore, it not only prevents the natural color effect of a copy product from being changed but also surely identify the image forming device by which the product was produced by the pattern added thereto.

Japanese Laid-Open Patent Publication No. 6-62217 describes a technique by which additional information (a pattern of symbols) being absent on an original image is modulated in accord with the intensity of an image signal input from an original material and then put on an output image to be reproduced by an image forming device. Namely, the symbol pattern intensity is weakened for a highlight portion of the image where human eyes have sharp sensitivity to a difference in optical density, while it is enhanced for a shadow portion where human eyes have low sensitivity to a difference in optical density.

This method can surely read a symbol pattern in any range of optical densities, making at the same time the symbol pattern be quiet.

SUMMARY OF THE INVENTION

The above-mentioned techniques, however, have the following respective problems.

A problem involved in the first technique is such that an allowable image cannot be reproduced or a prohibited image is reproduced if an original image is misjudged.

The second technique may be free from the trouble of the first technique but may have a decrease in image quality of a copy product since additional information is added to an original image.

Concerning the above drawback of the second technique, the methods disclosed in Japanese Patent Publication No. 2614369 and Japanese Laid-Open Patent Publication No. 6-62217 devise adding a specific pattern or a symbol pattern in such a manner that a decrease in quality of a copied image may be minimized. However, both methods still involve the following problems:

The method disclosed in Japanese Patent Publication No. 2614369 applies a specific pattern with coloring material (yellow) difficult to be recognized by human eyes. However, such the yellow pattern is striking in respect to other image portion having a particular color (e.g., blue).

The method disclosed in Japanese Laid-Open Patent Publication No. 6-62217 may have a striking symbol pattern (specific pattern) in a shadow portion (of high optical density) due to the enhancement of the pattern intensity.

In view of the above circumstances, the present invention was made with a primary object to provide an image forming device and method, which can obtain an output image combined (synthesized) from a specific pattern and a processed input image with no decrease in quality of an output image and which is featured by adding the specific pattern with a color that is unrecognizable by human eyes but recognizable by a recognizing device.

To achieve the above-described purpose, the present invention provides the following technical means:

A first technical means of the present invention is a color image forming device that comprises an image inputting means for inputting color image data, an image processing means for generating output color image data by processing the input image data according to a predetermined procedure, an image forming means for forming a color image on a recording medium by using of a plurality of visible coloring materials based on the output color image data, a specific pattern generating means for generating a specific pattern indicating specified information and a color-data adding means for adding data of the specific pattern to the output color image data so as to attach the specific pattern, wherein the color-data adding means adds the specific pattern data to the output color image data in such a manner that the specific pattern formed on the color image is hardly recognizable by human eyes but recognizable by a recognizing means.

In the above arrangement of the technical means, the color data adding means can provide an output image with a specific pattern which is difficult to be distinguished (recognized) by human vision but can surely be recognized by a recognizing means. Is proposed a method that utilizes a uniform color space of the L*a*b* color system defined by CIE (Commission Internationale de l'Eclairage), which system has a spectral sensitivity characteristic closest to the sensitivity of human eyes. Since the sensitivity characteristic of a charge coupled device (CCD) built in a recognizing means such as a color scanner is based on the common RGB color system, a specific pattern is added to an output color image data by using a color that has a small difference in the L*a*b* color system but can surely be recognized as a RGB color signal by the CCD. The specific pattern is thus added in the manner not to be distinguished by human eyes, so it does not impair the output image quality and can surely identify, by the specific pattern added to the color copy product, the color image device by which the product was produced.

A second technical means of the present invention has the same construction as that of the first technical means, wherein the color-data adding means adds a specific pattern data to the output color image data so that the specific pattern is formed on the output color image by using a color having a minimum color difference for the formed color image.

In addition to the effect of the first technical means, the second technical means enables the color data adding means to form the specific pattern not to be distinguished by human eyes from any other colored area in a range from low optical density to a high optical density owing to use of the color of the specific pattern, which has a minimum difference from a color of a surrounding area. This method is based on the fact that human's sense of sight cannot distinguish a small difference between two colors.

A third technical means of the present invention has the same construction as that of the first or second technical means, wherein the color-data adding means includes a memory means for storing a predetermined relation between the input color image data and output color image data and calculates a color of the specific pattern based on the input color image and the relation stored in the memory means.

In addition to the effect of the first or second technical means, the third technical means keeps in a memory data on the predetermined relation between input color image data and output color image data, so it can immediately select with ease an optimal color for the specific pattern to be added to the output image data. An exemplified relation between the input color image data and the output color image data is defined as a relation between color image data (RGB) read by an image inputting means and a uniform color space of the L*a*b* color system and a relation between the uniform color space and an output (YMCK) of an image output unit. Both relations are determined respectively by using a suitable method such as a neutral network and a method for determining coefficients for mask operation. The optimal color can thus determined based on the calculated relations.

A fourth technical means of the present invention has the same construction as that of the first or the second technical means, wherein the color-data adding means includes a color-data calculating means for determining the specific pattern color based on the input color image data.

In addition to the effect of the first or the second technical means, the fourth technical means can determine an optimal color of the specific pattern by calculation based on the input color image data with no need for additional memory capacity.

A fifth technical means of the present invention has the same construction as that of any of the first to fourth technical means, wherein the color-data adding means includes a combining means for combining the specific pattern data with the output color image data obtained from the image processing means.

In addition to the effect of any of the first to fourth technical means, the fifth technical means is provided with the combining (synthesizing) means for the color data adding means and can easily combine a specific pattern data with output color image data obtained by the image processing means. The image processing means processes input color image data read by the image inputting means, while the color adding means generates a specific pattern with a color that is hardly recognizable by human eyes but recognizable by a recognizing means. The processed color image data and the specific pattern data can be easily combined into output color image data by the combining means of the color adding means.

A sixth technical means of the present invention has the same construction as that of any one of the first to fourth technical means, wherein the color image processing means includes a combining portion for combining the specific pattern data from the color-data adding means with the input color image data to generate output color image data including the specific pattern data.

In addition to the effect of any of the first to fourth technical means, the sixth technical means is provided with the combining portion for the image processing means and can previously combine specific pattern color data with color image data to be output to the image forming means. The image processing means can thus generate output color image data including specific pattern data.

A seventh technical means of the present invention comprises an image processing step for generating output color image data by processing color image data according to a predetermined procedure, an image forming step for forming a color image on a recording medium by using a plurality of visible coloring materials, a color-data adding step for attaching a specific pattern indicating specific information to the color image by adding data of the specific pattern to the output color image data, wherein the specific pattern data is that the specific pattern formed on the color image is hardly recognizable by human eyes but recognizable by a recognizing means.

The above-described method can provide an output color image data with specific pattern that is difficult to be distinguished by human eyes but can be recognized by the recognizing means. In practice, an example is a method using a uniform color space of the CIE color system L*a*b* having a sensitivity characteristic closest to that of human eyes. In view of the fact that a charge coupled device (CCD) of a recognizing means such as a scanner has a sensitivity characteristic based on the usual RGB color system, a specific pattern is added to an output color image by using a color that has a small difference from the output image color according to the L*a*b* color system but can be clearly distinguished according to the RGB color system. Since the specific pattern added to the output color image is difficult to be distinguished by human eyes, the output color image may not be suffered to impairment of its quality and may surely identify, by the specific pattern added thereto, the image-forming device by which it was reproduced from the original.

An eighth technical means of the present invention has the same construction as that of the seventh technical, wherein the color-data adding step adds the specific pattern data to the output color image data so that the specific pattern is formed on the output color image by using a color having a minimum color difference for the formed color image. In addition to the effect of the seventh technical means, the eighth technical means can form the specific pattern not to be distinguished by human eyes from any other colored area in a range from low optical density to a high optical density owing to use of the color of the specific pattern, which has a minimum difference from that of a surrounding area.

A ninth technical means of the present invention has the same construction as that of the seventh or eighth technical means, wherein the color-data adding step determines a color of the specific pattern based on the input color image data.

In addition to the effect of the seventh or eighth means, the ninth technical means has the color-data adding step which can determine an optimal color based on input color image data with no need for use any additional memory.

A tenth technical means of the present invention has the same construction as that of any one of the seventh to ninth technical means, wherein the color data adding step which is used for determining the specific pattern data, further comprises a first calculating step for calculating a relation between the input color image data and a uniform color space, a second calculating step for determining a minimum value of a color difference between the input color-image data and data variable within a given range of color image data to be inputted, a third calculating step for converting the minimum color-difference value into the output color image data and a fourth calculating step for determining a relation between output color image data and a uniform color space.

According to the tenth technical means, it is possible to obtain, in addition to the effect of any of the seventh to ninth technical means, an advantage of surely determining with ease a color of the specific pattern having a least color difference value, which can be attached to the output color image data and can be surely recognized on the output color image by recognizing means. It is also possible to previously determine the relation between various kinds of input color-image data and the uniform color space, which enables the recognizing means to surely recognize the specific pattern.

The color image forming device and the color image forming method according to the present invention will be described with reference to the following accompanying drawings.

PREFERRED EMBODIMENTS OF THE PRESENT INVENTION

Figure 1:
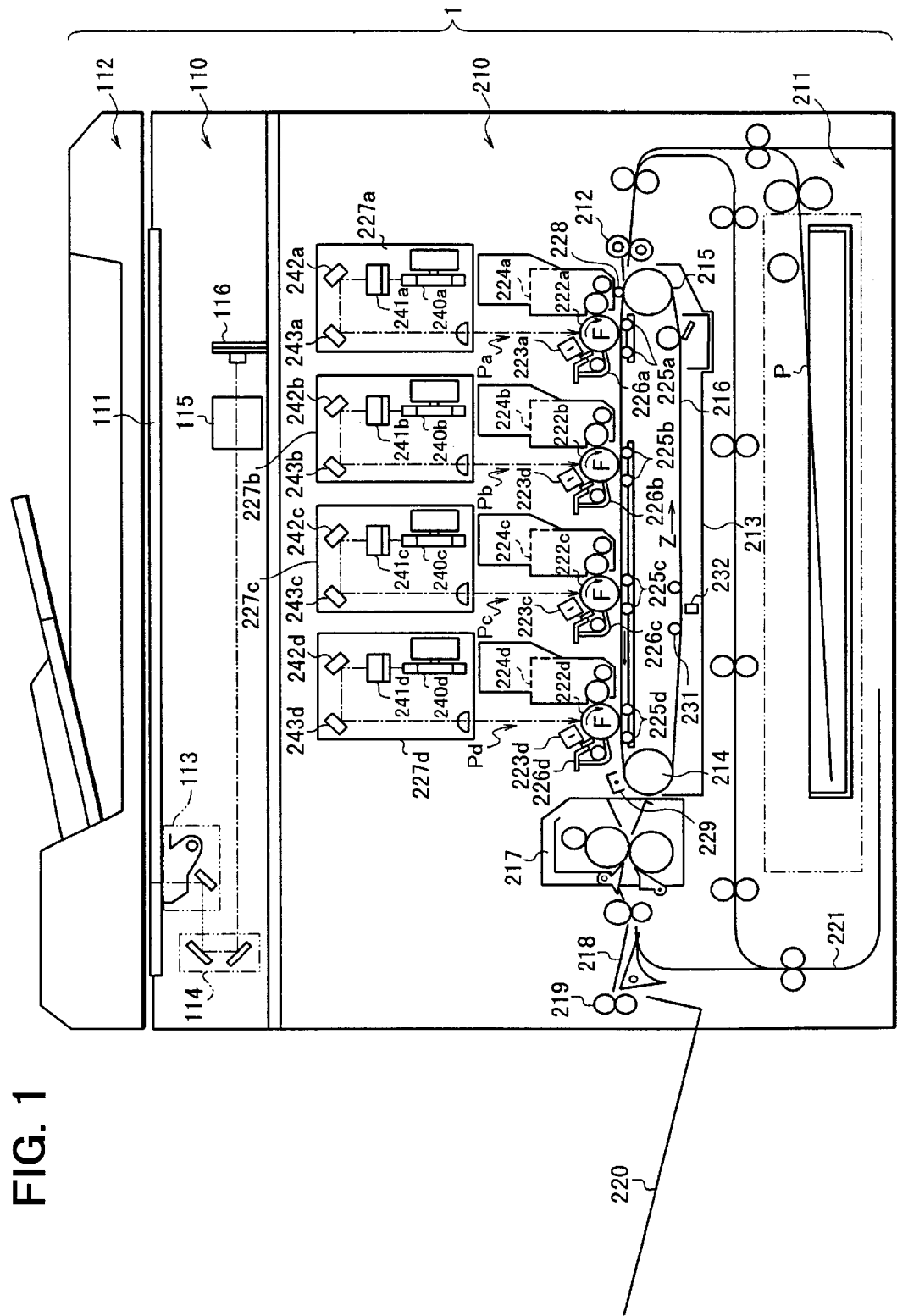
FIG. 1 is a schematic front sectional view of a color image forming device according to the present invention.

FIG. 1 is a schematic front sectional view of a digital color-image forming device according to an aspect of the present invention. As shown in FIG. 1, the color-image forming device has a main body 1 that has at its top a document table 111 and a control panel (not shown) and incorporates an image input unit (image inputting means) 110 and the image output unit (image outputting means) 210.

The document table 111 is provided at its top with the reversing automatic document feeder (RADF) 112 that can be open and close with respect to the document table and is mounted in a given position relative to the document table 111.

This document feeder (RADF) 112 is designed to feed an original document sheet to the document table 111 in such a manner that one side of the original is placed on a given position of the document table opposite to the image input unit 110. On completion of reading that side of the original by the image-input unit 110, the document feeder 112 turns over the original and feeds it again to the given position of the document table 111 to place the other side of the original document opposite to the image input unit 110. When images on both surfaces of the original were read, the document feeder 112 delivers the original out of the main body and, then, begins feeding of a next original to the document table. The above document feeding and reversing operation is controlled in accord with an entire system operation of the color-image forming device.

The image input unit 110 is disposed below the document table 111 to read an image on an original transported and put on the document table by the document feeder 112. This image input unit 110 includes an original image scanners 113 and 114 each being capable of parallel sliding along the bottom surface of the document table 111, an optical lens 115 and a charge coupled device (CCD) line sensor 116 being a photo-electric converting element.

The original image scanner is composed of a first scanning unit 113 and a second scanning unit 114. The first scanning unit 113 has a lamp for illuminating the image on the surface of an original and a first mirror for deflecting a light image from the original in a given direction. It travels at a specified speed in a horizontal direction along the bottom surface of the document table 111 in parallel, keeping a constant distance from the bottom surface thereof. The second scanning unit 114 has a second mirror and a third mirror, which receive the original image light deflected from the first mirror of the first scanning unit 113 and further reflect the light in respective specified directions. The second scanning unit 114 reciprocally travels parallel with the first scanning unit 113 keeping a constant speed relative to the speed of the first scanning unit 113.

The optical lens 115 reduces the size of the original light image deflected from the third mirror of the second scanning unit 114 and focuses the light of the contracted image on a given position of the CCD line sensor 116.

The CCD line sensor 116 photo-electrically converts focused light of the image into a series of output electrical signals. The CCD line sensor 116 is a three-line color CCD that can read a monochromatic image or a color image, decompose it to color components R(Red), G(Green) and, B(Blue) and output data of three lines. The series of electrical signals representing the original image information is further transferred from the line sensor 116 to an image processing unit (FIGS. 3 and 6) for further necessary processing.

The construction of the image output unit 210 will be described below.

The image output unit 210 is provided in its lower portion with a paper-feeding mechanism 211 that feeds separately a sheet of copy paper (recording medium) P from a pile of paper sheets on a paper tray to the image output unit 210. A separate paper sheet P is transported to the image output unit 210 under timing control by a pair of register rollers 212 disposed close to an inlet of the image output unit 210. The paper sheet P having an image printed on one side is transported again to the image output unit 210 in accordance with the timing control of the image output unit 210.

In the lower portion of the image output unit 210 is a transfer belt device 213 that comprises a transfer endless belt 216 engagingly stretched between a driving roller 214 and a driven roller 215. The transfer belt device 216 transports a paper sheet P electro-statically adhering to its belt. A pattern-detecting unit 232 is disposed under the transfer belt 216.

A fixing device 217 for fixing a toner image formed on the paper sheet P is arranged on the downstream side of the transfer belt device 213. The paper sheet P passes through a nip between paired fixing rollers of the fixing device 217 and through a switching gate 218, then it is delivered by outlet rollers 219 to an outlet tray 220 attached to the external wall of the copier housing 1.

A switching gate 218 is intended to selectively switch a path from the fixing device 217 to a path for delivering the paper sheet P to the outlet tray or a path for returning it to the image output unit 210. The paper sheet P directed by the switching gate 218 to the image output unit 210 is reverse directed with its rear edge forward through a switchback-transporting path 221. It is further turned upside down during transportation and fed again to the image output unit 210.

In the image output unit 210, the image forming portions No. 1(Pa), No. 2(Pb), No. 3(Pc) and No. 4(Pd) are arranged in parallel to each other and closely above the transfer belt 216 in the described order from the upstream side.

Transfer belt 216 is frictionally driven in the direction shown by arrow Z (FIG. 1) by the driving roller 214. It transports a paper sheet P fed from the paper-feeding device 211 to the image-forming portions Pa–Pd subsequently.

The image-forming portions Pa–Pd have the substantially same structure. Their light-sensitive drums 222a–222d are driven in the direction shown by arrows F in FIG. 1.

Each of the light-sensitive drums 222a–222d is surrounded by a charger 223a, 223b, 223c, 223d for evenly charging a working surface of the light-sensitive drum 222a–222d, a developing device 224a, 224b, 224c, 224d for developing with toner a latent image formed on the surface of the light-sensitive drum 222a–222d, a transfer discharger 225a, 225b, 225c, 225d for transferring the developed toner image onto a paper sheet P and a cleaning device 226a, 226b, 226c, 226d for scrapping off toner remaining on the drum surface. The above devices are arranged around the light-sensitive drum in the described order in the rotational direction of the drum.

Above each light-sensitive drum 222a–222d is a laser-beam scanner unit 227a, 227b, 227c, 227d, which is composed of a semiconductor laser element (not shown) for generating light modulated by image data, a polygonal mirror (deflecting device) 240a–240d for deflecting a laser beam from the semiconductor laser element in the main horizontal scanning direction, a lens fθ 241a–241d and mirrors 242a–242d, 243a–243d for forming an image on a surface of the light-sensitive drum 222a–222d.

The laser-beam scanning unit 227a receives an image signal corresponding to a black color image component of an original color image, the laser-beam scanning unit 227b receives an image signal corresponding to a cyan color image component, the laser-beam scanning unit 227c receives an image signal corresponding to a magenta color image component and the laser-beam scanning unit 227d receives a yellow color image component.

Latent images corresponding to image-information of an original is formed on respective light-sensitive drums 222a–222d. The developing device 224a stores black toner (K), the developing device 224b stores cyan color toner (C), the developing device 224c stores magenta color toner (M) and the developing device 224d stores yellow toner (Y). The latent images formed on the respective light-sensitive drums 222a–222d are developed with toner from the respective developing devices 224a–224d. The original image information is converted by the image output unit 210 to color component images that are thus reproduced as respective color component images by the respective developing devices.

The charger 228 is disposed between the first image-forming portion Pa and the paper-feeding device 211 and electrically charges the surface of the transfer belt 216. The paper sheet P fed by the paper-feeding device 211 and persistently adheres to the transfer belt 216 by the effect of electrostatic force and reliably transported by the transfer belt 216 through the first to fourth image forming portions Pa–Pd.

A discharger 229 is disposed just above the driving roller 214 of the transfer belt 216 between fourth image-forming station Pb and a fixing device 217. The discharger 229 is supplied with an alternate current to separate the paper sheet P from the transfer belt 216.

In the above-described digital color image forming device, cut sheets of paper are used as paper sheets P. The paper sheet P is fed from a paper sheet cassette into a guide of a paper transporting path of the paper-feeding device 211 and its front edge is detected by a sensor (not shown) that in turn generates a detection signal to paired register rollers 212 for temporally stopping the paper sheet P.

The paper sheet P is then sent onto the transfer belt 216 rotating in the direction shown by arrow Z in FIG. 1 in synchronism with the operation of the image forming portions Pa–Pd. Since the transfer belt 216 is electrically charged by the charger for adhering 228, the paper sheet P is stably transported by the transfer belt while passing through the image forming stations Pa-Pd.

At the image forming stations Pa–Pd, the respective color-toner images transferred subsequently onto the paper sheet P adhering to the transfer belt 216. On completion of transferring the last toner image at the fourth image forming portion Pd, the paper sheet P is separated from the transfer belt 216 by the discharger 229 and led to the fixing device 217 from the top. The paper sheet P with the color image fixed thereon is delivered through a paper outlet (not shown) onto a delivery tray 220.

In the above-described color-image forming device, the laser-beam scanning units 227a–227d are used to write light images with laser beams on the light-sensitive surfaces of the light-sensitive drums. It is also possible to use, in replace of the laser-beam scanning units, optical writing system (LED: Light Emitting Diode heads) each composed of an array of light-emitting diodes and a focusing lens array. The LED head is smaller than the laser-beam scanning unit and has no moving part, emitting no sound. Therefore, the LED heads are suitable to use in tandem type digital color copiers that have to use a plurality of light writing units.

(Regarding a Specific Pattern (FIG. 2))

Figure 2:
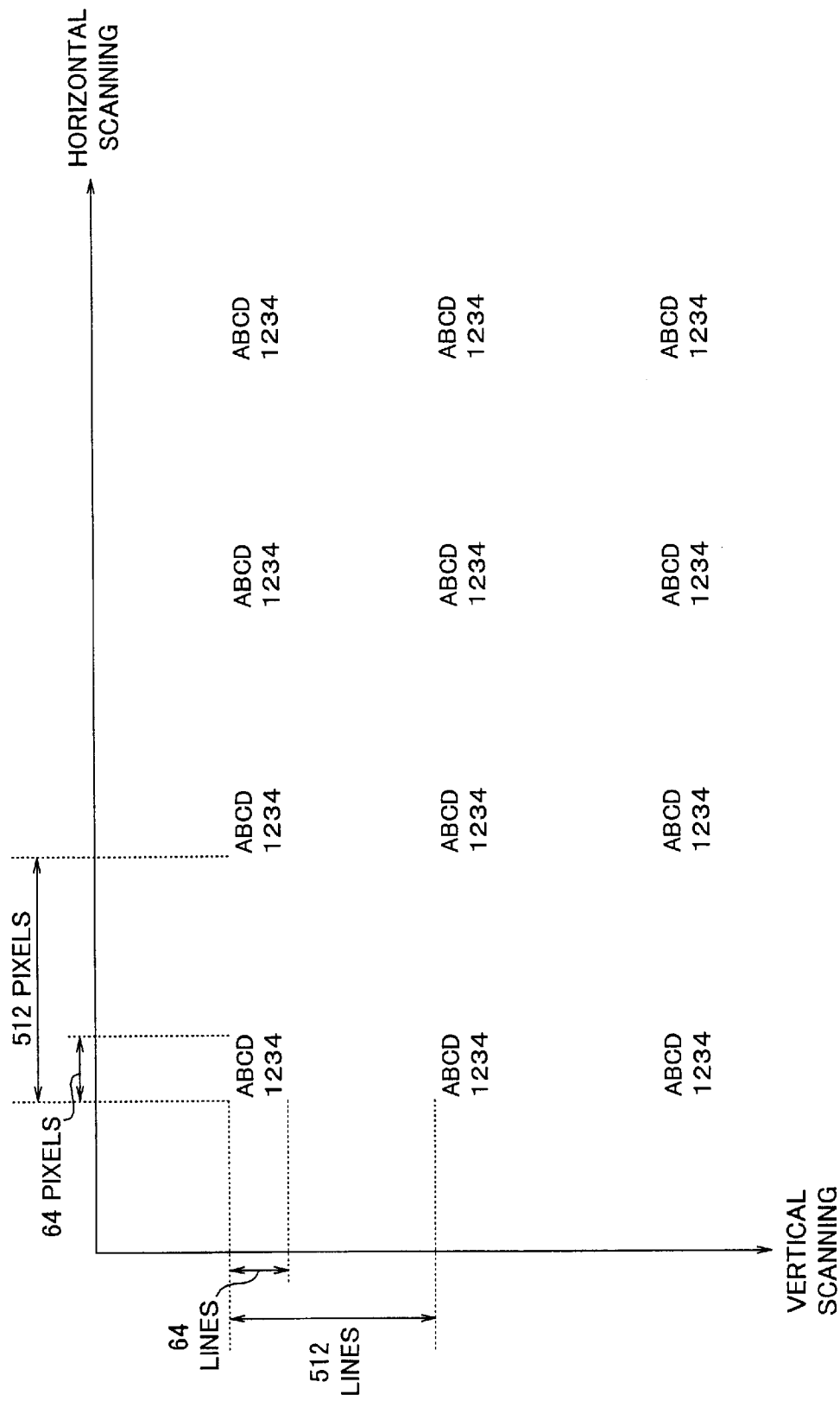
FIG. 2 illustrates an exemplified specific pattern added to a color image.

In case of forming a copy of a copyrighted or copy-prohibited original image in a color-image forming device and by a color-image forming method according to the present invention, a specific pattern as shown in FIG. 2 is added to the image to be formed and printed.

FIG. 2 illustrates a specific pattern "ABCD1234' repeatedly added onto a color image formed by the image output device 210 based on output color-image data. The specific pattern is indicative of identification unique to an image-forming device (means) by which the image with the pattern added thereto was formed and printed. The specific pattern is not limited to the above and may be any identifier as far as it is recognizable by a recognizing means and suitable to identify an image-forming device that has produced a prohibited copy of the original image.

The specific pattern is formed of a given size (e.g., 64 by 64 pixels in horizontal by 64 lines in vertical scanning directions) and repeatedly added to an output image at constant intervals (e.g., every 512 pixels in horizontal scanning direction and every 512 lines in vertical scanning direction).

The method for adding the specific pattern to a color image will be described later.

(An Image Processing Device and a Color Data Adding Means (FIGS. 3 and 6))

Figure 3:
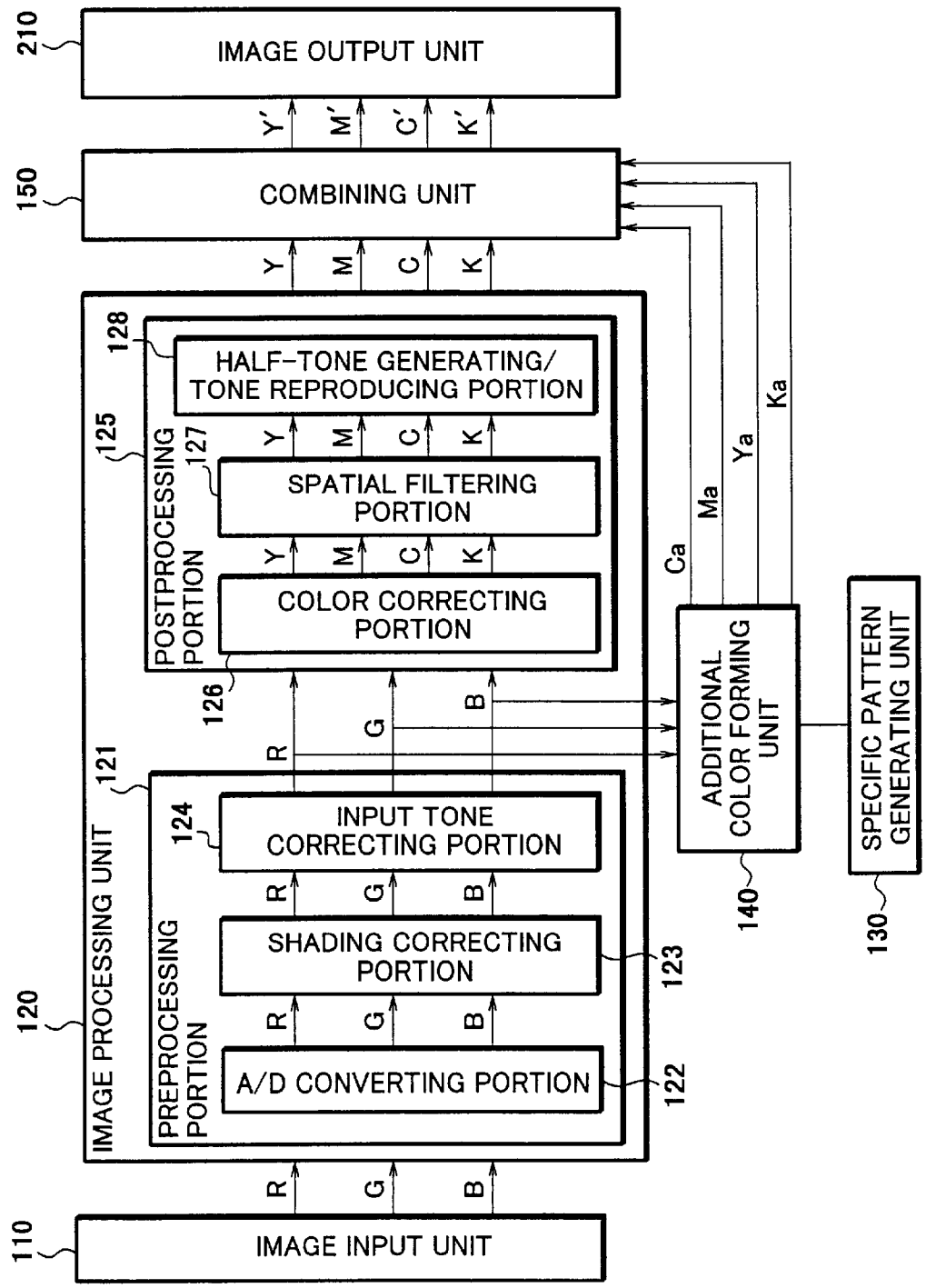
FIG. 3 is a block diagram showing a structure of an essential portion of a color image forming device according to the present invention.

As shown in FIG. 3, the color image forming device comprises, in addition to an image input unit 110, an image output unit 210, an image processing unit (image processing means) 120, an additional color forming unit (additional color forming means) 140, a specific pattern generating unit (specific pattern generating means) 130 and a combining unit (synthesizing means) 150.

As shown in FIG. 3, the image processing unit 120 is composed of a preprocessing portion 121 and a post-processing portion 125. The preprocessing portion 121 is composed of an A/D (analog/digital) converting portion 122, a shading correcting portion 123 and an input tone correcting portion 124. An analog RGB signals read by the image input unit 110 are input through color CCD sensors to the A/D converting portion whereby they are converted into respective digital signals. The digital signals are then transferred to the shading correcting portion 123 whereby they are processed to remove off distortion caused from illumination, focusing and imaging processes of the image input unit 110. After this, the input tone correcting portion 124 adjusts the color balance of a RGB reflection factor signal and, at the same time, converts it into an optical density signal suitable for further image processing. The signal from the input tone correcting portion 124 is input to the post-processing portion 125 and the additional color forming unit 140.

The post processing portion 125 is composed of a color correcting portion 126, a spatial filter processing portion 127 and a half-tone generating/tone reproducing portion 128. To achieve a faithful reproduction of the original image color, the color correcting portion 126 performs the necessary color correction for eliminating color impurity including unnecessarily absorbed components according to spectral characteristics of CMY coloring materials. The spatial filtering portion 127 spatially processes the color-corrected image signal by a digital filter to eliminate a shade (fuzziness) or granular quality degradation of an output image by correcting spatial frequency characteristic of the signal. The half-tone generating/tone reproducing portion 128 corrects output tone by converting an optical density signal into a dot percentage, which corresponds to a characteristic value of the image output unit 210, and then performs tone reproduction process by decomposing the image into pixels and reproducing tone of respective pixels.

Color image data input by the image input unit 110 is processed by the processing unit 120 and is then output as output color image data to the image output unit 210. Between the image processing unit 120 and the image output unit 210 shown in FIG. 3, there is disposed the combining (synthesizing) unit 150 that combines the output color image data with specific pattern data received from the additional color forming unit 140.

The specific pattern data is generated by the specific pattern generating unit 130 and then output to the additional color forming unit 140 that in turn calculates color data of the specific pattern based on the input color image data. The obtained data of the specific pattern is output to the combining unit 150 whereby it is combined with the color image data to be transferred to the image output unit 210.

Referring to FIG. 3, a flow of data from the image input unit 110 to the image output unit 210 is more concretely described as follows:

RGB-color image data from the image input unit 110 is now input to the system. The RGB-color image data is output through the preprocessing portion 121 to the post processing portion 125 and at the same time to the additional color forming unit 140.

In the post processing portion 125, the RGB-color image data is converted into to YMCK-color image data and generated as output color image data. In the additional color forming unit 140, color image data of a specific pattern received from the specific pattern generating unit 130 is calculated based on the RGB-color image data. The specific pattern data is generated as YMCK color data that is represented as YaMaCaKa in the FIG. 3. The specific pattern data YaMaCaKa is transferred to the combining unit 150.

In the combining unit 150, the YMCK-color image data (output color-image data) from the image processing unit 120 and the specific pattern data YaMaCaKa from the additional color forming unit 140 are combined into output color image data Y'M'C'K' including the specific pattern data. The generated output color image data is then transferred to the image output unit 210 that forms a color image based on the received Y'M'C'K' color image data.

Figure 6:
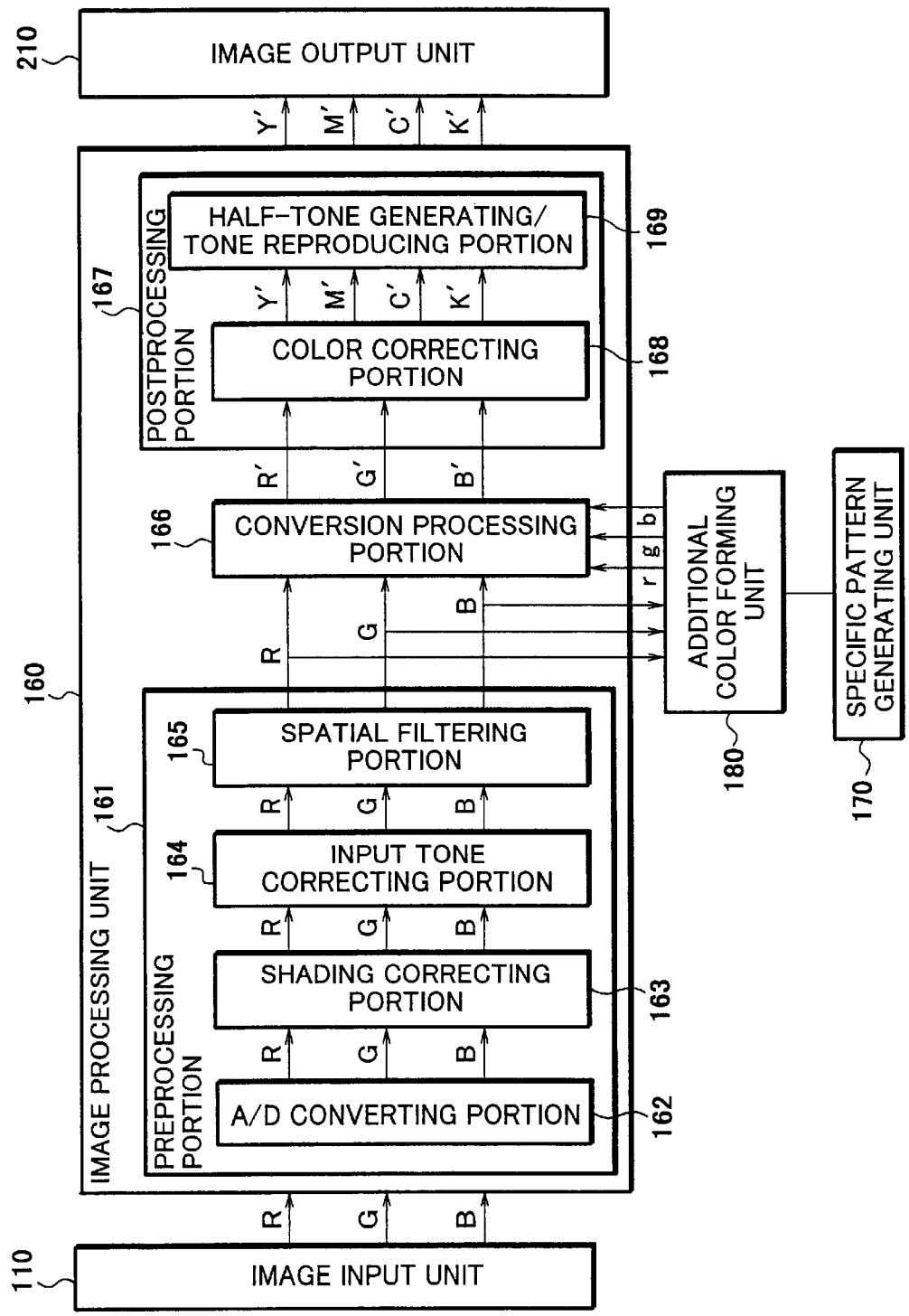
FIG. 6 is a block diagram showing a structure of an essential portion of a color image forming device according to another aspect of the present invention.

In the image forming device according to the shown embodiment of present invention, the color data adding means is composed of the additional color forming unit 140 and the combining unit 150 and generates the Y'M'C'K'-color image data as the output color image data including the specific pattern data. According to another embodiment of the present invention, an additional color forming unit 180 can output a RGB-signal as shown in FIG. 6. In this case, an image processing unit 160 is provided with a combining unit capable of combining the color image data with the specific pattern data received from the additional color forming unit 180. A color adding means is merely the additional color forming unit 180. Namely, the image forming device of FIG. 6 includes a conversion processing unit 166 (as the above-mentioned synthesizing unit) between a preprocessing portion 161 and a post processing portion 167, which conversion processing portion generates RGB color image data including a specific pattern data by combining RGB color image data from the preprocessing portion 161 with the specific pattern color data from the additional color forming unit 180. In practice, the conversion processing portion 166 provides the post processing portion 167 with an R'G'B' signal instead of an RGB signal from the preprocessing portion 161 when the additional color forming unit 180 generates a rgb signal. When an RaGaBa signal is fed from the additional color forming unit 180, it is added to an RGB signal from the conversion processing portion 166 to generate an R'G'B' signal. (The R'G'B' signal and the RaGaBa signal are described later in detail.)

The image processing unit 160 of FIG. 6 differs from the device of FIG. 3 by the provision of a spatial filtering portion 165 in the preprocessing portion 161. This means that data including specific pattern data is a synthesis of input color image data and micro-additional color data, which must avoid processing with spatial filters because the combined data, if spatially filtered, may be so smoothed that the specific pattern cannot be recognized by the recognizing means.

A halftone generating/tone reproducing portion 169 uses a pixel-by-pixel processing method other than an error diffusion method, dither method and multi-line method. The use of the error diffusion method may cause distribution of the specific pattern data as the error to the surrounding pixels. On the other hand, the dither method and the multi-line method, both of which process image data by using thresholds, may cause the loss of the specific pattern information depending on a dither size and a pattern size.

Referring to FIG. 6, a flow of image data from the image input unit 110 to the image output unit 210 is more concretely described as follows:

RGB-color image data from the image input unit 110 is now input to the system of FIG. 6. The RGB-color image data is output through the preprocessing portion 161 to the post processing portion 167 and at the same time to the additional color forming unit 180.

The RGB-color image data is output to the conversion processing portion 166 before the post processing portion 167. In the additional color forming unit 180, color data of a specific pattern generated by the specific pattern generating unit 170 is calculated based on the color image data output to the additional color forming unit 180. The calculated color data is represented as "rgb" data in FIG. 6. Namely, the specific pattern data is generated as RGB data, whereby the device differs from the device of FIG. 4.

The specific pattern data "rgb" is transferred to the conversion processing portion 166 wherein the RGB-color image data and the specific pattern data rgb are combined into R'G'B' color image data that is then transferred to the post processing portion 167. In the post processing portion 167, the R'G'B'-color image data is converted into to Y'M'C'K-color image data that is directly transferred to the image output unit 210 since it already contains the specific pattern data. In the image output unit 210, an image is generated based on the Y'M'C'K' color image data.

(Addition of Color Data of a Specific Pattern Data)

A method for adding color data to the above specific pattern will be described below.

The specific pattern is read by a recognizing device (recognizing means) such as a scanner. Since a charge-coupled device (CCD) of the scanner has the sensitivity characteristic different from that of human eyes, it is possible to form a specific pattern with a color that is difficult to recognize by human eyes but is easily recognizable by the scanner. Therefore, the present invention devises the generation of the specific pattern with such a color that can be read by the scanner but visually unrecognizable by human eyes.

In practice, the uniform color space of the L*a*b* color system (L* is a luminosity factor and a* and b* are perceptible chromaticity) defined by CIE (Commission Internationale de l'Eclairage) is adopted as the color system having a sensitivity characteristic closest to that of human eyes. On the other hand, the charge-coupled device of the scanner has a sensitivity characteristic according to the usual RGB color system. In this case, the scanner may not always be identical to the image input devices shown in FIGS. 1 and 3.

The specific pattern is therefore represented in such a color that has a small difference from a surrounding area color in the L*a*b* color system but is recognizable in the RGB color system. The color has a minimal color difference relative to that of the color image to be formed.

A color-data adding means for adding the specific pattern having a specified color is implemented as the additional color forming unit 140 or 180 of FIG. 3 or 6 according to the present invention. The additional color forming unit 140 or 180 selects a color having a small color difference in the L*a*b* color system but being clearly recognizable in the RGB color system relative to an original color image according to specified data and adds the determined color data to a specific pattern received from the specific pattern generating unit (130 or 170). Input color image data must be contained at least as the data necessary for determining the color of the specific pattern by the additional color forming unit 140 or 180.

The additional color forming unit 140 or 180 may be constructed in practice of (1) a memory unit (storing means) for previously storing the relation between input color image data and output color image data or (2) an additional color calculating unit (color data calculating means) for calculating a color of the specific pattern based on the input color image data.

A method (algorithm) for calculating an additional color in each unit will be described below on the condition that a RGB signal of input color image data is input and a YMCK signal is obtained after processing the input image.

(1) In case of using an additional color forming unit as the memory unit:

In the additional color forming unit of the memory unit, a relation between input color image data and output color image data is obtained by the following five steps ① to ⑤ and stored in a memory that is preferably a look up table (LUT).

① A relation between the image input unit and a uniform color space of the L*a*b* color system, i.e., the input characteristic of the image input unit is first calculated. This is the first calculation step. The input characteristic is determined by using a suitable color chart.

The density data of each color is measured by a calorimeter with reference to the color chart including records of a plurality of density values (patches) for each color of the YMCK color system. This color chart contains not primary colors YMC but mixtures of primary colors, preferably a larger number of mixed colors.

Color data according to the L*a*b* color system is thus obtained. Next in the second operation step, color data according to the RGB color system is obtained by reading the same color chart by the image input unit. The L*a*b* color system data and the RGB color system data are related to each other by a suitable method using, e.g., a neutral network and a calculation method of mask operation coefficients. The input characteristic of the image input unit is determined by the above-mentioned process.

After the input characteristic is defined and stored in the memory unit, a color of the specific pattern is decided based on the input color image data and the above input characteristic of the image input unit. In this instance, it is also necessary to previously determine a relation between the image output unit and the uniform color space so that an output color image can have the specific pattern formed thereon, which is reliably recognizable by the image output unit. Therefore, the above relation, i.e., the output characteristic of the image output unit is determined in advance. This is the fourth calculation step. This step also uses the same color chart as used in the first step.

The color image data (CMYK) of color coordinates, which can be output by the image output unit, is measured by the colorimeter used for calculation-of the input characteristic. The data according to the L*a*b* color system is thus obtained. The relation between the L*a*b* color system data and the color coordinate system image data (CMYK) is then determined by using a neutral network and/or a mask coefficient calculation method like the input characteristic calculation. The output characteristic of the image output unit is defined by the above process.

② After calculation of the input and output characteristics, data necessary for determining a concrete color of the specific pattern are determined. Since the specific pattern shall be recognizable by the recognizing unit but unrecognizable by human eyes, the RGB data are changed to such a difference level so that thee are unrecognizable by human eyes but recognizable by the recognizing unit. At that level, values $L^*_m \cdot a^*_m \cdot b^*_m$ (where m=1, 2, 3, . . . ) for corresponding colors of the RGB data.

The difference level is unrecognizable by human eyes but recognizable by the recognizing unit and its data are previously collected. A method for discriminating the difference level recognizable by the recognizing unit is by way of example as follows:

$$(\Delta R + \Delta G + \Delta B) > Th$$

$$\Delta R^2 + \Delta G^2 + \Delta B^2 > Th$$

In this instance, $\Delta R \cdot \Delta G \cdot \Delta B$ are differences between colors of the specific pattern and colors of the original color image (colors of areas whereto the specific pattern is not added) and Th is a threshold set based on a various kinds of related data.

③ Among the obtained values $L^*_m \cdot a^*_m \cdot b^*_m$, a value showing a least change to human eyes [$\{L^*+(\Delta L^*)_{min.}\}$, $\{a^*+(\Delta a^*)_{min.}\}$, $\{b^*+(\Delta b^*)_{min.}\}$] is selected. This is the second calculation step.

A color difference is used as a color unrecognizable by human eyes. It is difficult for human eyes to distinguish a small difference between two colors. Therefore, a color difference $\Delta Eab^*$ between the specific pattern color and the original image color is defined as follows:

$$\Delta Eab^* = [(\Delta L^*)^2 + (\Delta a^*)^2 + (\Delta b^*)^2]^{1/2}$$

The color difference ($\Delta Eab^*$) having the least (minimum) ($\Delta L^*, \Delta a^*, \Delta b^*$), i.e., a value $\{(\Delta L)_{min.}, (\Delta a)_{min.}, (\Delta b)_{min.}\}$ is determined.

④ A value (C'·M'·Y'·K') corresponding to the above value [$\{L^*+(\Delta L^*)_{min.}\}$, $\{a^*+(\Delta a^*)_{min.}\}$, $\{b^*+(\Delta b^*)_{min.}\}$] is then determined. This is the third calculation step.

In this instance, it is also possible to determine a value (R'·G'·B') instead of the value (C'·M'·Y'·K'). It is also permitted to calculate a difference (Ra·Ga·Ba) from output data (R·G·B) of an area to which the specific pattern is not added. That is, Ra=R–R',
Ga=G–G' and
Ba=B–B' are determined. This is shown as r·g·b in FIG. 6. In this instance, the step 5 (described later) can be omitted.

⑤ A difference (Ca·Ma·Ya·Ka) between the value (C'·M'·Y'·K') and the output data (C·M·Y·K) of the area not containing a specific pattern is calculated as follows:

Ca=C'–C,
Ma=M'–M,
Ya=Y'–Y and
Ka=K'–K.

The value Ca·Ma·Ya·Ka is additional color data that is then stored in the memory unit LUT (Look Up Table).

Figure 4:
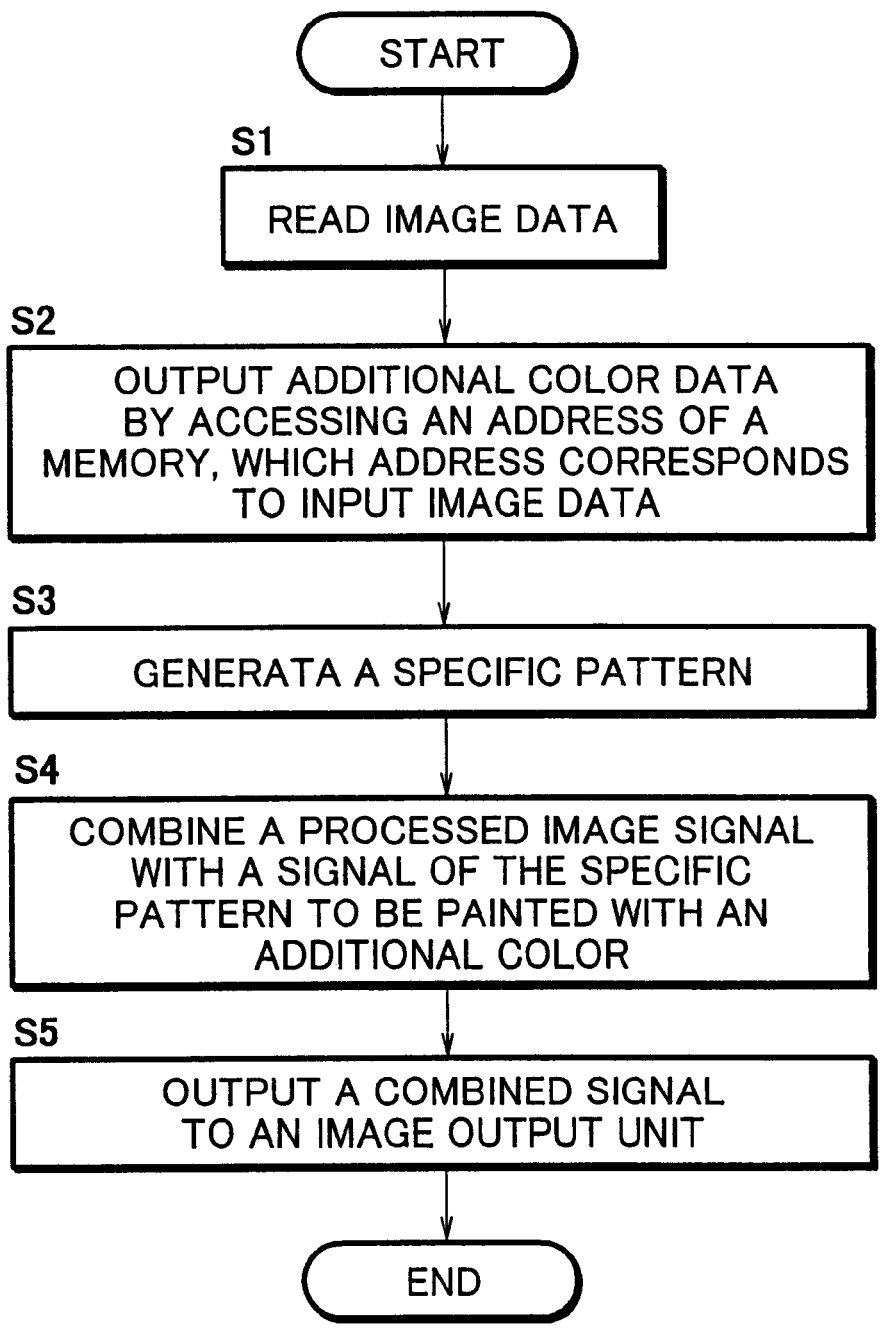
FIG. 4 is a flowchart describing a procedure of combining image data with a specific pattern data.

Referring to the flowchart of FIG. 4, a process for combining a specific pattern is now described below. In Step S1, a color image data is (read) input through the image input unit 110. In Step S2, a CPU of the system makes an access to a corresponding address of the memory unit (LUT) based on the input color image data and outputs predetermined additional color data. In Step S3, the CPU causes the specific pattern generating unit 130 to generate a specific pattern. In Step S4, the input color image data (C·M·Y·K) and the specific pattern signal with additional color data are combined with each other. In Step S5, a combined signal (C'·M'·Y'·K') is finally output to the image output unit 210.

Figure 5:
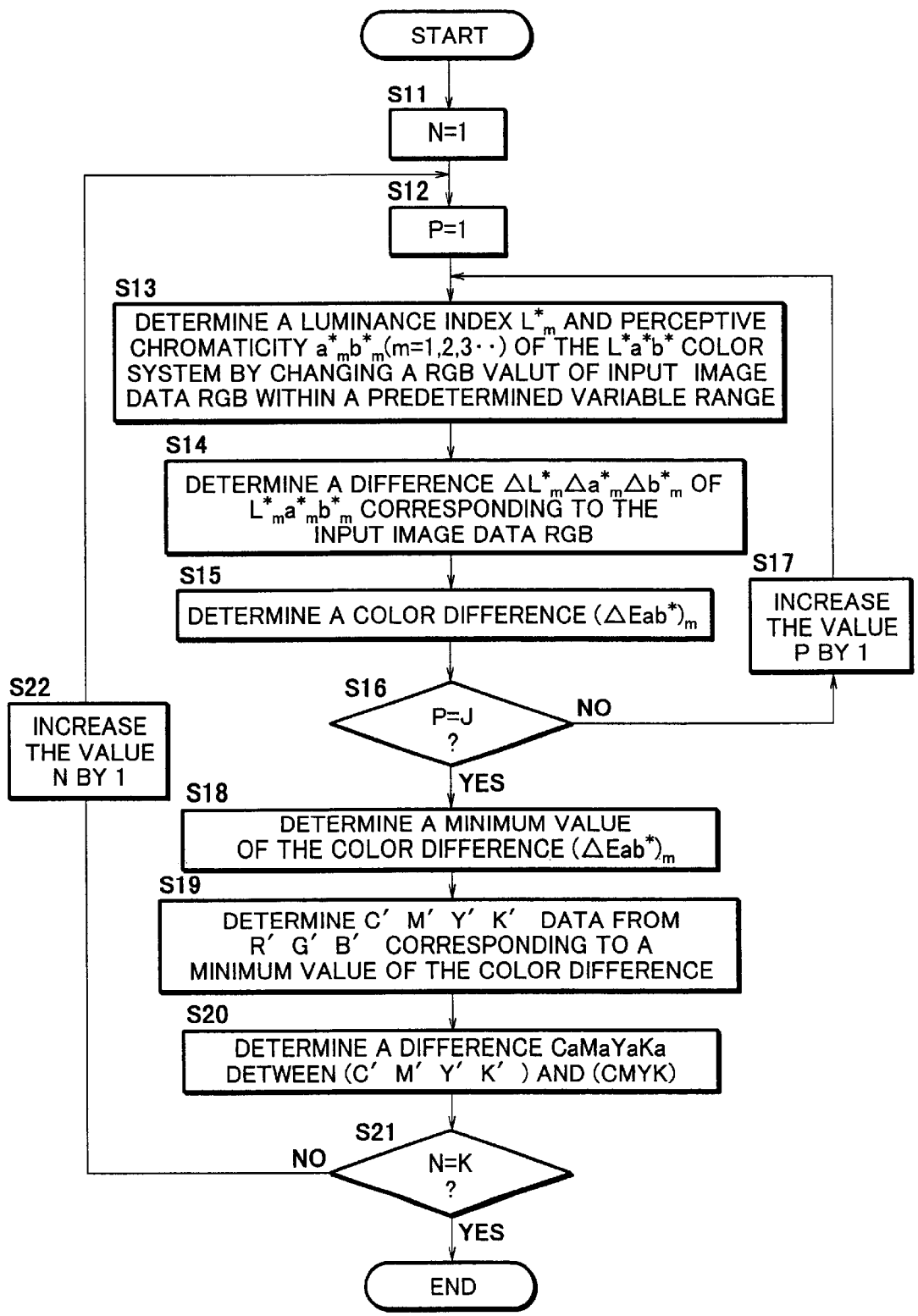
FIG. 5 is a flowchart describing a procedure of determining an additional color having a minimum color difference in a color image forming device according to the present invention.

Referring to the flowchart of FIG. 5, the process of determining (by calculation) a color of the specific pattern is now described.

In Step S11, the number N of data is set first to 1. In Step S12, a variable RGB range P of an input image signal is set to 1. In Step S13, the luminance index $L^*_m$ and perceptible chromaticity $a^*_m \cdot b^*_m$ (m=1, 2, 3, . . . ) of the L*a*b* color system for the input image data RGB is determined by varying the RGB within the preset range. In this Step S13, the calculation is performed for each level of input RGB data since a recognizable RGB range of the recognizing unit depends upon the input RGB level.

In Step S14, a difference ($\Delta L^*_m, \Delta a^*_m, \Delta b^*_m$) of $L^*_m \cdot a^*_m \cdot b^*_m$ corresponding to the input image data RGB is determined as follows:

$\Delta L^*_m = L^*_m - L^*$,
$\Delta a^*_m = a^*_m - a^*$ and
$\Delta b^*_m = b^*_m - b^*$.

In Step S15, a color difference ($\Delta Eab^*$)m is determined from the above calculation results ($\Delta L^*_m, \Delta a^*_m, \Delta b^*_m$).

In Step S16, a check is made for whether the variable range P is a predetermined value J (i.e., P=J). If P is not equal to J (P≠J), the value P is increased by 1 in Step S17 and, then, the process returns to Step S13 to repeat the calculation. The above steps are repeated until the specified number of calculations is reached (P=J). If P=J in Step S16, the process advances to Step S18 to determine $(\Delta L)_{min.} \cdot (\Delta a)_{min.} \cdot (\Delta b)_{min.}$ at which a least value of $(\Delta Eab^*)_m$ is obtained.

In Step 519, a value [$\{L+(\Delta L)$ min.), (a+($\Delta a$) min.), $\{b+(\Delta b)$ min$\}$] is determined from the above minimal value obtained and, then corresponding data C'·M'·Y'·K'are determined. In case of using the RGB data, this step is omitted since the corresponding RGB is already known in Step S18.

In Step S20, a difference Ca·Ma·Ya·Ka between the C'·M'·Y'·K' and the C·M·Y·K is determined. In Step S21, a check is made for whether N is equal to K (N=K). If N is not equal K (i.e., N≠K), the value N is increased by 1 in Step S22 and, then, the process returns to Step S12 to repeat the above calculation for another input data RGB. When N=K, the process is finished.

(2) In case of using an additional color forming unit that is an additional color calculating unit:

In this instance, the input characteristic data of the image input unit 110 and the output characteristic data of the image output unit 210 are first determined (calculated) by an additional color calculating unit using for example a neutral network as described before in item ①. Similarly, the calculation steps ② to ⑤ are also carried out.

Figure 7:
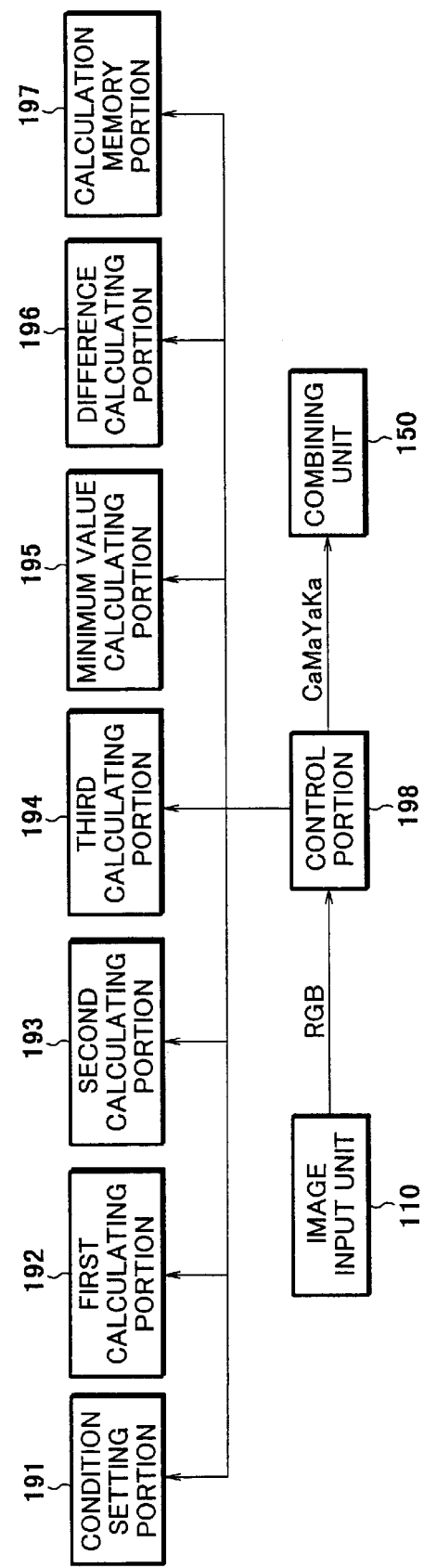
FIG. 7 is a block diagram of an additional color forming unit composed of an additional color calculating portions.

As shown in FIG. 7, a practical additional color calculating unit may comprise for example a condition setting portion 191, a first calculating portion 192, a second calculating portion 193, a third calculating portion 194, a least (minimum) value calculating portion 195, a difference calculating portion 196, a calculation memory portion 197 and a control portion 198. This additional color calculating unit is intended to determine color data of a specific pattern from RGB data inputted from the image input unit 110.

When the specific pattern color data is of CaMaYaKa as shown in FIG. 3, the combining unit 150 combines an output color image data including the color data. The combining unit is omitted if the specific pattern color data is RGB data.

The condition setting portion 191 is for example a look-up table (LUT). This portion sets a variable range of each signal in accordance with an input color image data, i.e., RGB data level. The variable range of each data is predetermined and stored.

The first calculating portion 192 determines $L^*_m \cdot a^*_m \cdot b^*_m$ by changing (R·G·B) within the predetermined range. In this instance, the neutral network is utilized.

The third calculating portion 194 determines a difference of each element ($\Delta L^*_m$, $\Delta a^*_m$, $\Delta b^*_m$) and calculates a color difference $(\Delta Eab^*)_m$.

The minimum value calculating portion 195 determines a minimum value $(\Delta Eab^*)_{min.}$ of the color difference $(\Delta Eab^*)_m$. In consequence, data $(\Delta L^*)_{min.} \cdot (\Delta a^*)_{min.} \cdot (\Delta b^*)_{min.}$ is obtained.

The second calculating portion 193 calculates data $[\{L+(\Delta L)_{min.}\}, \{a+(\Delta a)_{min.}\}, \{b+(\Delta b^*)_{min.}\}]$ and converts the obtained data into data (C'·M'·Y'·K') by using the neutral network. The second calculating portion is incorporated in a color correcting portion of a post processing portion of an image processing device in case when the additional color calculating unit (additional color forming unit) outputs RGB data.

A difference calculating portion 196 determines a difference (Ca·Ma·Ya·Ka) between (C·M·Y·K) and (C'·M'·Y'·K'). Instead, it determines a difference (Ra·Ga·Ba) between (R·G·B·) and (R'·G'·B').

A calculation memory portion 197 stores the color difference $\Delta Eab^*$ calculated by changing (R·G·B) within the predetermined range.

A control portion 198 controls the above operations and the inputs and/or of the data.

Figure 8:
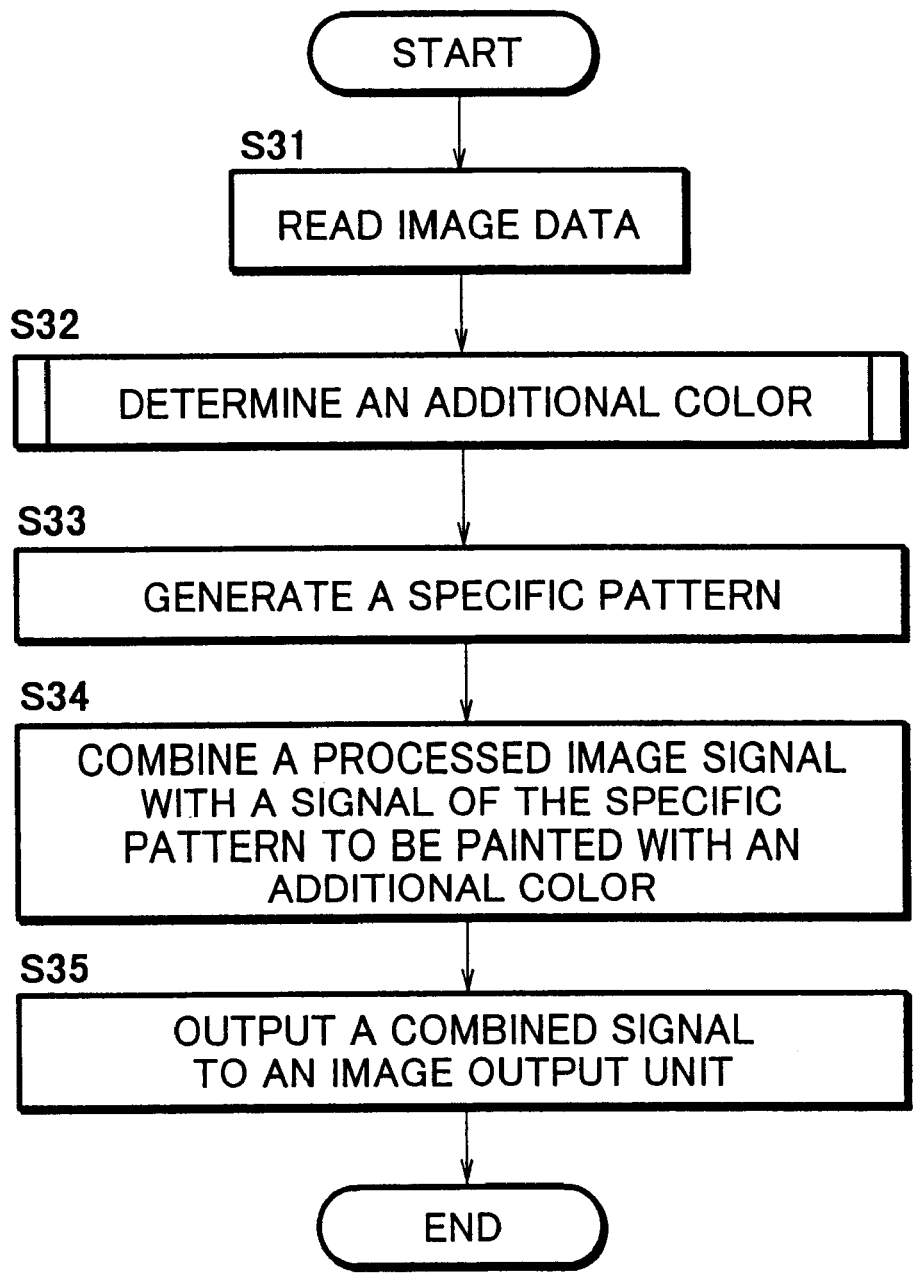
FIG. 8 is a flowchart describing a procedure for calculating an additional color by the additional color calculating portions.

Referring to the flowchart of FIG. 8, a process for combining a specific pattern is now described.

In Step S31, a color image data is input through the image input (read) unit 110 to the image processing system. In Step S32, an additional color is calculated (determined) according to the input color image data. In Step S33, a specific pattern is generated by the specific pattern generating unit 130. In Step S34, the input color image data (C·M·Y·K) and the specific pattern signal with additional color data are combined with each other.

In Step S35, a combined signal (C'·M'·Y'·K') is finally output to the image output unit 210.

Figure 9:
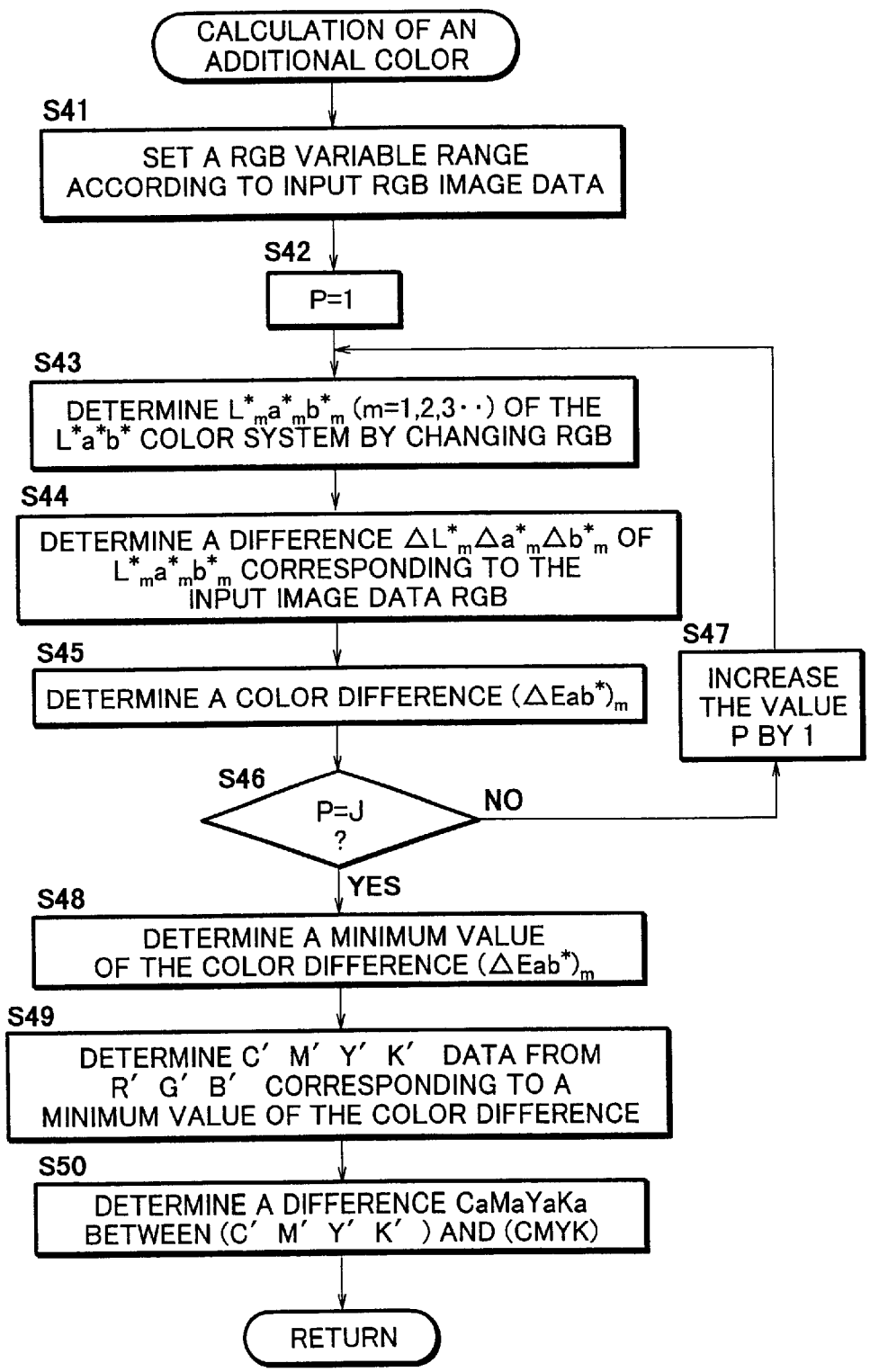
FIG. 9 is a flowchart depicting the detail of additional color calculation in the additional color calculating step of FIG. 8.

Referring to the flowchart of FIG. 9, the process of setting (calculating) a color of the specific pattern is described below.

In Step S41, a variable RGB range is set according to the input image RGB-data. In Step S42, the variable RGB range P is set to 1. Step S43 to S50 are similar to Steps S13 to S20 shown in FIG. 5. On completion of Step S50, the process returns.

In the foregoing description of the preferred embodiments, a specific pattern is added to an original color image by adding a specified color thereto. However, the present invention is not limited to the above method and provides the forming of a specific pattern on an original color image by 'subtracting' a specified color from the original color image.

Figure 10:
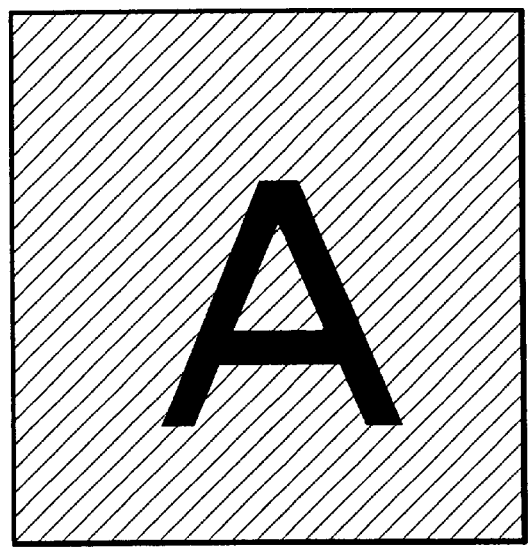
FIG. 10 is a view for explaining a state of forming a specific pattern of FIG. 2 by 'adding' a color to an original color image.

In the foregoing embodiments, a specific pattern is formed with a suitable coloring material on an original image as shown by way of example in FIG. 10 (where a character A is overlaid on an original image). Namely, the specific pattern is formed on the original color image by 'adding' an additional specified color.

Figure 11:
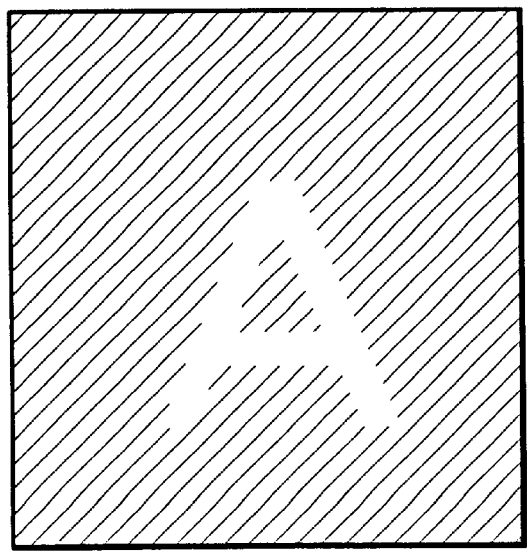
FIG. 11 is a view for explaining a state of forming a specific pattern of FIG. 2 by 'subtracting' a color from an original color image.

On the contrary, it is also possible to form a specific pattern on an original color image by 'omitting' any suitable of coloring materials forming the original color image only from an area corresponding to a specific pattern as shown in FIG. 11. Namely, the specific pattern is formed in the original color image by 'subtracting' a certain color from an area of the specific pattern. In this case, it is, of course, possible to 'subtract' a visually most quiet color component from the portion of the original color image by applying the image processing method described before. In this instance (FIG. 11), it is necessary to use, instead of the additional color forming unit, a subtracting color forming unit capable of deleting a visually most-quiet color from a specified area of the original color image data.

In the preferred embodiments, a uniform color space such as of the L*a*b* color system is used for purpose of description. Therefore, it is not intended to limit the present invention only to that color system.

As is apparent from the foregoing description, the present invention offers the following advantages:

(1) A specific pattern can be added to an original image without degrading the image quality since a specific pattern is formed thereon by applying a coloring material that is hardly recognizable by human eyes but recognizable by a recognizing unit. A specific pattern formed on a color image product can surely identify a source device by which the product was produced.

(2) A specific pattern is added to an original color image by using a color that has a minimum color difference relative to the original color image, thereby the formed pattern is visually hardly recognizable in the range from low to high optical density.

(3) Since a relation between input color image data and output color image data is predetermined and stored, an optimal color of a specific pattern can be selected quickly and easily.

(4) An optimal color of a specific pattern can be determined with no additional memory capacity of the hardware since a color data calculating means determines the pattern color every time based on input color image data.

(5) The provision of a combining means makes it possible to easily combine the specific pattern data with the output color data obtained by an image processing means.

(6) The image processing means provided with a combining portion makes it possible to previously combine color data of a specific pattern with color image data to be output to an image output unit. Namely, the image processing means can generate output color image data including specific pattern data.

(7) A specific pattern can be surely added with ease onto an output color image by using a color material that is hardly recognizable by human eyes but recognizable by a recognizing means. The specific pattern thus formed on the output color image never impair the quality of the original color image and can surely identify the color image forming device by which the color image product was produced with the specific pattern.

(8) A certain color that has a minimum color difference usable for forming a specific pattern can be reliably determined with ease. It is possible to reliably recognize a specific pattern by a recognizing means by using a predetermined relation between input color image data and a uniform color space.

What is claimed is:

1. A color image forming device, comprising an image inputting means for inputting color image data, an image processing means for generating output color image data by processing the input image data according to a predetermined procedure, an image forming means for forming a color image on a recording medium by using a plurality of visible coloring materials based on the output color image data, a specific pattern generating means for generating a specific pattern indicating specified information and a color-data adding means for adding data of the specific pattern to the output color image data so as to attach the specific pattern to the color image, wherein the color-data adding means generates a plurality of specific pattern image data by changing the color image data to which the specific pattern is attached within a range of changes hardly recognizable by human eyes but recognizable by a recognizing means;

calculates a value of a color difference between the color image data to which the specific pattern is attached and each of the plurality of specific pattern image data; and adds a least value of color difference as the specific pattern data to the output color image data, wherein the least value of color difference corresponds to a minimum color difference between the specific pattern image data and the color image data to which the specific pattern is attached.

2. A color image forming device as defined in claim 1, wherein the color-data adding means includes a memory means for storing a predetermined relation between the input color image data and output color image data and calculates a color of the specific pattern based on the input color image and the relation stored in the memory means.

3. A color image forming device as defined in claim 1, wherein the color-data adding means includes a color-data calculating means for determining the specific pattern color based on the input color image data.

4. A color image forming device as defined in claim 1, wherein the color-data adding means includes a color-data calculating means for determining the specific pattern color based on the input color image data.

5. A color image forming device as defined in any one of claims 1, 2, 3 or 4, wherein the color-data adding means includes a combining means for combining the specific pattern data with the output color image data obtained from the image processing means.

6. A color image forming device as defined in any one of claims 1, 2, 3 or 4, wherein the color image processing means includes a combining portion for combining the specific pattern data from the color-data adding means with the input color image data to generate the output color image data including the specific pattern data.

7. A color image forming method comprising an image processing step for generating output color image data by processing input color image data according to a predetermined procedure, an image forming step for forming a color image on a recording medium by using a plurality of visible coloring materials based on the output color image data and a color-data adding step for adding a specific pattern data to the output color image data so as to attach the specific pattern to the color image, wherein the color-data adding step includes generating a plurality of specific pattern image data by changing the color image data to which the specific pattern is attached within a range of changes hardly recognizable by human eyes but recognizable by a recognizing means;

calculating a value of a color difference between color image data to which the specific pattern is attached and each of the plurality of specific pattern image data; and adding a least value of color difference as the specific pattern data to the output color image data, wherein the least value of color difference corresponds to a minimum color difference between the specific pattern image data and the color image data to which the specific pattern is attached.

8. A color image forming method as defined in claim 7, wherein the color-data adding step determines a color of the specific pattern based on the input color image data.

9. A color image forming method as defined in any one of claims 7 or 8, wherein the color-data adding step, which is used for determining the specific pattern data, further comprises a first calculating step for calculating a relation between the input color image data and a uniform color space, a second calculating step for determining a minimum value of a color difference between the input color image data and data variable within a given range of color image data to be inputted, a third calculating step for converting the minimum color-difference value into the output color image data and a fourth calculating step for determining a relation between the output color image data and the uniform color space.

* * * * *